(No Model.) 2 Sheets—Sheet 1.
W. D. JOHNSON.
MACHINE FOR CUTTING WOODEN VESSELS.
No. 315,509. Patented Apr. 14, 1885.
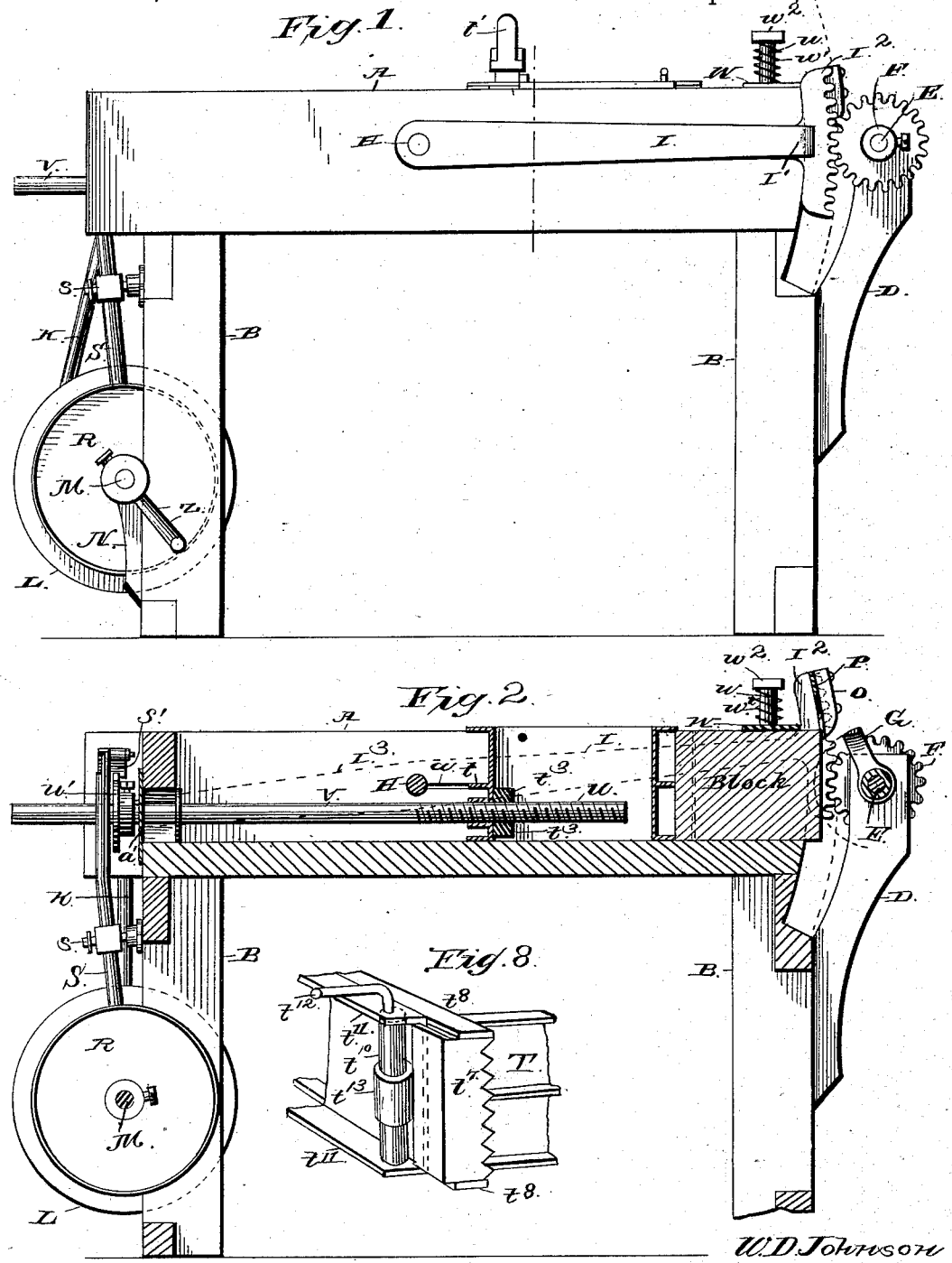
WITNESSES
M. E. Fowler
E. G. Siggers
INVENTOR
W. D. Johnson
by C. A. Snow & Co.
Attorneys (No Model.) 2 Sheets—Sheet 2.
W. D. JOHNSON.
MACHINE FOR CUTTING WOODEN VESSELS.
No. 315,509. Patented Apr. 14, 1885.
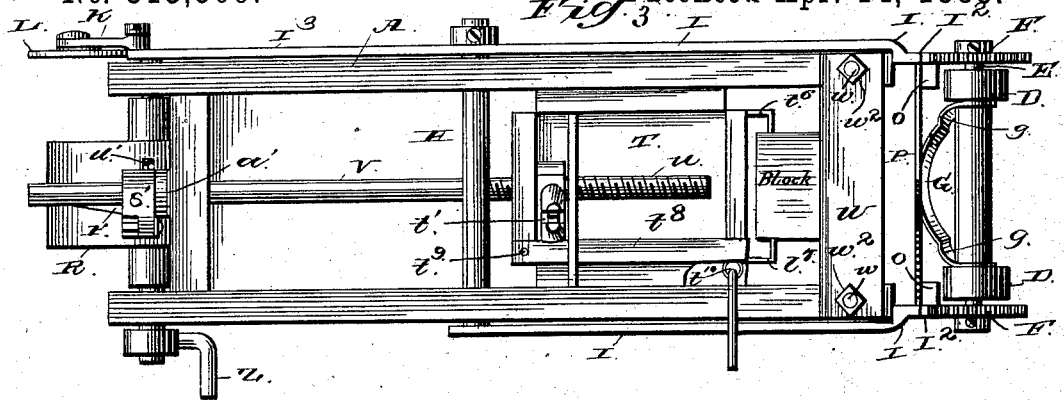
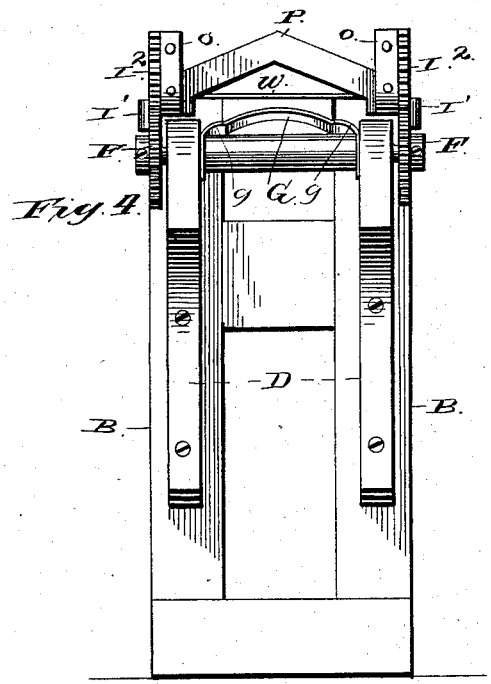
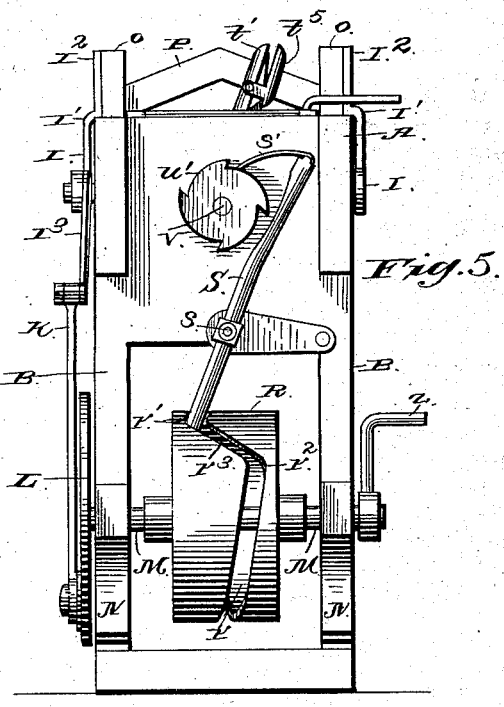
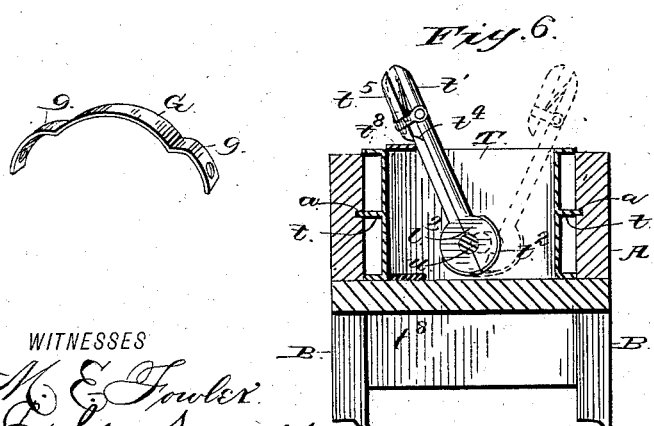
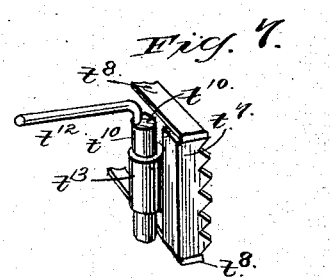
WITNESSES
M. E. Fowler
E. G. Siggers
W. D. Johnson
INVENTOR
by C. A. Snow & Co.
Attorney

UNITED STATES PATENT OFFICE.

WILLIAM D. JOHNSON, OF ELMORE, OHIO.

MACHINE FOR CUTTING WOODEN VESSELS.

SPECIFICATION forming part of Letters Patent No. 315,509, dated April 14, 1885.

Application filed January 20, 1885. (No model.)

*To all whom it may concern:*

Be it known that I, WILLIAM D. JOHNSON, a citizen of the United States, residing at Elmore, in the county of Ottawa and State of Ohio, have invented a new and useful Improvement in Machines for Cutting Wooden Vessels, of which the following is a specification, reference being had to the accompanying drawings.

My invention relates to an improvement in machines for cutting wooden plates; and it consists in the peculiar construction and combination of devices that will be more fully set forth hereinafter, and particularly pointed out in the claims.

In the accompanying drawings, Figure 1 is a side elevation of my invention. Fig. 2 is a vertical longitudinal sectional view of the same. Fig. 3 is a top plan view. Fig. 4 is a front elevation. Fig. 5 is a rear elevation. Fig. 6 is a transverse section taken on the line $x\,x$ of Fig. 1. Fig. 7 is a detailed perspective of the curved cutter. Fig. 8 is a detailed perspective view.

The frame of my improved machine consists of a box or trough, A, which is supported upon suitable legs, B. On the front side of the frame are secured bearing-brackets, D, in which is journaled a shaft, E, the center of which is on a line with the center of the trough, as shown. Spurred pinions F are secured to the outer ends of the shaft, and a curved knife or cutter, G, is also secured thereto in between the brackets.

H represents a rock-shaft which passes horizontally through the trough and is journaled in the sides thereof in the same horizontal plane with the shaft E. To the extremities of this rock-shaft are attached the side arms, I, which extend forward to the front end of the trough, where they are provided with enlarged heads I', which form arcs of a circle drawn from the center of the rock-shaft. These heads are provided on their front sides with curved racks, $I^2$, which mesh with the pinions F. One of the side arms is provided with a rearward extension, $I^3$, which is connected by a rod, K, with a crank-wheel, L, that is secured to a shaft, M, which shaft is journaled in bearings N on the rear side of the rear legs of the trough. A cutter-head, O, is bolted to the front sides of the heads of the side arms, and is curved in conformity thereto; and in between this cutter-head and the heads of the arms is secured a cutter, P, which extends transversely across the mouth of the trough, and is shaped like an inverted V, as shown at Fig. 4. To the shaft M is fixed a cam-wheel, R, in the periphery of which is cut a groove, $r$. This groove runs spirally around the wheel, starting at the point $r'$, until it reaches the point $r^2$ on the opposite side of the face of the wheel, and from the point $r^2$ to the point $r'$ extends the short angular groove $r^3$. A lever, S, is pivoted to the rear end of the trough, as at $s$. The lower end of this lever works in the groove of the cam-wheel, and to its upper end is pivoted a dog, $s'$. T represents a sliding feed-box that is placed in the trough, and that is adapted to travel back and forth in said trough, being guided by horizontally extending flanges $t$, which fit in grooves $a$ with which the trough is provided. To the inner side of the rear wall of the box T is secured a split lever, $t'$, which has its lower ends hinged together by a spring, $t^2$. The lower divided halves of this lever are enlarged, as at $t^3$, and are each provided with the half of a circular opening, which is screw-threaded and adapted to receive the threaded end $v$ of a rod, V, which extends horizontally along the trough and is journaled in the rear end thereof, as at $a'$. To the protruding rear end of this rod is fixed a wheel, $v'$, which is provided with four ratchet-teeth, and with which the dog $s'$ engages, as shown at Fig. 5. The fixed half of the split lever is provided with a beveled projection, $t^4$, and the free end of the lever has a pivoted spring-actuated catch, $t^5$, which is adapted to catch over the projection $t^4$ and lock the divided halves of the split lever together. When the lever has its halves locked together, the threaded rod V is secured between its enlarged threaded ends; but when the lever is open the threaded rod is released.

To the front side of the box T, on one side, is secured the serrated dog $t^6$, and to the opposite side is secured the serrated dog $t^7$, which has rearwardly-projecting arms $t^8$, that are pivoted to the rear wall of the feed-box, as at $t^9$. A cam, $t^{10}$, is pivoted in between the upper and lower projecting side flanges, $t^{11}$, of the box, and has the lever $t^{12}$, by which the cam is rotated. A loop, $t^{13}$, from the pivoted dog, passes around the cam, and thereby, when the cam-lever is turned in the position shown in Figs. 3, 7, and 8, the pivoted dog is forced in and caused to engage with the block. When the cam-lever is turned parallel with the side of the box, the cam withdraws the dog from engagement with the block and releases it.

In between the dogs $t^6$ and $t^7$ is secured a block of wood from which the plates are to be cut. A presser-bar, W, extends across the upper side of the trough, near its mouth, and is adapted to slide vertically upon rods $w$, that project upwardly from the upper sides of the trough, and springs $w'$ bear upon the upper side of the bar, and are placed upon the rods $w$. The upper ends of these rods are screw-threaded, and nuts $w^2$, which are secured thereon, regulate the tension of the springs upon the presser-bar.

A crank, Z, or a pulley is attached to the shaft M, for the purpose of applying power to actuate the machine.

The machines which have been heretofore constructed for cutting wooden plates from blocks have been adapted to cut plates that have a straight or level upper edge, this edge being cut by a cutter which operates vertically.

My invention is designed to cut plates that have their upper edges lower in the center than they are at the ends, this being accomplished by the knife or cutter P, which operates in an arc of a circle, its arms from which it derives its motion being pivoted to the trough by the rock-shaft H, as previously described.

The operation of my invention is as follows: Motion being imparted to the shaft M is communicated, through the crank-wheel L and rod K, to the side arms, to which the edge-cutter P is secured, and this cutter is oscillated up and down across the mouth of the trough. The pinions F gear with the rack-bars, with which the front ends of the side arms are provided, and the shaft E is oscillated thereby. The curved cutter G is attached to the shaft E, and is adapted to make its downward cut a little in advance of the edge cutter. This downward cut of the knife or cutter G hollows out the inner side of the plate that is to be cut from the block, and the cutter P, which follows a little after the curved cutter, rounds off the edges of the plate, so as to leave the ends of the plate higher than the center. While the cutters are oscillated once and returned to their initial position, ready for a second downstroke, the lower end of the lever S is in the spiral portion of the groove of the cam-wheel, and its upper end is drawing the dog $s'$ loosely up over the ratchet-wheel $v'$, so as to cause the dog to engage with the upper tooth of said ratchet-wheel. Just at this point, and just as the cutters are ready to descend, the rotation of the cam-wheel brings the oblique-angled portion of the groove to operate on the lower end of the lever S, the movement of which lever is thereby suddenly and quickly reversed, and the dog $s'$ gives the feed screw-threaded rod V a quarter-turn, which moves the feed-box and the block forward a distance that corresponds to the desired thickness of the plate to be cut. The cutter G as it descends cuts the plate from the block and hollows the block ready to form the next plate, and the cutter P rounds off its edges, as before described. This operation is repeated until the block is consumed, when the split lever is opened, the feed screw-threaded rod disengaged therefrom, and the feed-box pushed back toward the rear end of the trough to its initial position, when a new block is secured thereto and the operation proceeded with as before. The function of the presser-bar is to prevent the hollowed end of the block from being raised up out of position by the return movement of the cutters.

An objection that has heretofore existed to wooden plates of the common form is that they are difficult to catch hold of when filled and piled high with lard, butter, or similar articles; and in order to prevent this objection I design my machine to form plates that have a scalloped thumb-hold cut in one or both of their ends. In order to accomplish this result I provide the cutter G with shoulders $g$, which are also sharpened, and are adapted to cut out a scallop at each end of the plate as it is being hollowed out, as will be very readily understood. This cutter I have shown in detail at Fig. 7.

I have not shown, nor more particularly described, the form of plate that this machine is adapted to cut, for the reason that I design to make a plate of this form the subject-matter for a separate application for a patent.

Having thus described my invention, I claim—

1. A machine for cutting concavo-convex shells having a rounded upper edge, the same comprising in its construction an oscillating or revolving shaft having a curved knife which is secured at both its ends to said shaft, and a facing oscillating or revolving knife attached to a shaft whose axis is located parallel with the shaft carrying the curved knife, the knives being so arranged with relation to each other that the path of one is intersected by the path of the other, substantially as described.

2. The combination of the trough, the shaft having spurred pinions, the curved cutter secured to said shaft, the side arms secured to a rock-shaft that is journaled in the trough, and provided with racks for engaging with the pinions, and the cutter that is secured between the pivoted oscillating side arms, substantially as described.

3. The combination of the trough, the shaft having spurred pinions, the curved cutter secured to said shaft, side arms that are secured to a rock-shaft that is journaled in the trough, and provided with racks for engaging with the pinions, a cutter that is secured between the pivoted side arms, and a shaft having a crank and a connecting-rod for oscillating the side arms, substantially as described.

4. The combination of the trough, the driving-shaft, the cam-wheel affixed thereto, the pivoted lever that enters the groove of the cam-wheel, the dog pivoted to the lever, the screw-threaded feed-rod journaled in the trough, the sliding feed-box that engages therewith, and the ratchet-wheel that is fixed to the feed-rod, substantially as described.

5. The combination of the trough, the feed-box that is adapted to slide therein, the threaded feed-rod that is journaled in the trough, and a lever secured to the feed-box, and having a threaded opening that is adapted to be connected to or disconnected from the threaded rod, substantially as described.

6. The combination of the trough, the shaft having the spurred pinions, the curved cutter secured to said shaft, side arms that are pivoted to the trough and provided with racks for engaging with the pinions, a cutter that is secured between the pivoted side arms, a driving-shaft having a crank and a connecting-rod for oscillating the pivoted side arms, the cam-wheel affixed to the driving-shaft, the pivoted lever that enters the groove of the cam-wheel, the dog pivoted to said lever, the screw-threaded feed-rod journaled in the trough, the feed-box that engages therewith, and the ratchet-wheel that is fixed to the feed-rod, substantially as described.

7. The combination of the trough, the shaft having spurred pinions, the curved cutter secured to said shaft, side arms that are pivoted to the trough and provided with racks for engaging with the pinions, a cutter that is secured between the pivoted side arms, a driving-shaft having a crank and a connecting-rod for oscillating the side arms, the cam-wheel affixed to the driving-shaft, the pivoted lever that enters the groove of the cam-wheel, the dog that is pivoted to said lever, the screw-threaded feed-rod journaled in the trough, the ratchet-wheel fixed thereto, and a feed-box provided with a lever having a threaded opening that is adapted to be engaged with or disconnected from the threaded feed-rod, substantially as described.

8. The combination of the feed-box, having the fixed serrated dog on one side and the serrated dog pivoted to the box on the opposite side, the cam journaled in the side of the box, and connected to the pivoted dog by a loop, and a lever secured to the cam for rotating the cam and moving the pivoted dog, substantially as described.

In testimony that I claim the foregoing as my own I have hereto affixed my signature in presence of witnesses.

WILLIAM D. JOHNSON.

Witnesses:
WM. N. MOORE,
M. E. FOWLER,
EDWARD G. SIGGERS.